United States Patent [19]
Keijser et al.

[11] Patent Number: 5,923,127
[45] Date of Patent: Jul. 13, 1999

[54] HIGH-PRESSURE DISCHARGE LAMP WITH MINIATURE DISCHARGE VESSEL AND INTEGRATED CIRCUITRY

[75] Inventors: Robertus A. J. Keijser; Oscar J. Deurloo; Aswin J. G. Linden; Arthur Kimmels; Willem J. Van Den Hoek, all of Eindhoven, Netherlands

[73] Assignee: U.S. Philips Corporation, New York, N.Y.

[21] Appl. No.: 08/854,002

[22] Filed: May 8, 1997

[30] Foreign Application Priority Data

May 9, 1996 [EP] European Pat. Off. .............. 96201271

[51] Int. Cl.⁶ ...................................................... H05B 37/00
[52] U.S. Cl. .......................... 315/224; 315/240; 315/287; 313/634
[58] Field of Search ...................................... 315/307, 308, 315/240, 226, 287, DIG. 2, DIG. 5, DIG. 7, 209 R, 219, 224, 225, 290, 244, 246, 119, 200 R; 313/631, 634, 637, 638, 639, 640–643

[56] References Cited

U.S. PATENT DOCUMENTS

| 4,291,254 | 9/1981 | Arlt et al. ................................ 315/240 |
| 4,475,061 | 10/1984 | Van De Weijer et al. ............. 313/623 |
| 4,527,097 | 7/1985 | Van Der Heijden et al. .......... 315/246 |
| 4,929,863 | 5/1990 | Verbeek et al. ......................... 313/113 |
| 5,097,176 | 3/1992 | De Hair et al. ......................... 313/570 |
| 5,233,273 | 8/1993 | Waki et al. .............................. 315/224 |
| 5,245,483 | 9/1993 | Van Gestel ................................ 360/40 |
| 5,335,117 | 8/1994 | Park et al. ................................ 360/48 |
| 5,381,274 | 1/1995 | Ueda ......................................... 360/48 |
| 5,424,878 | 6/1995 | Rijckaert ................................ 360/19.1 |
| 5,473,479 | 12/1995 | Takakura .................................. 360/48 |

FOREIGN PATENT DOCUMENTS

| 0215524A1 | 3/1987 | European Pat. Off. . |
| 0443964 | 8/1991 | European Pat. Off. . |
| 2074801 | 4/1981 | United Kingdom . |
| 2162683 | 2/1986 | United Kingdom . |

*Primary Examiner*—Don Wong
*Assistant Examiner*—David H. Vu
*Attorney, Agent, or Firm*—F. Brice Faller

[57] ABSTRACT

A discharge vessel with a ceramic wall is filled with inert gas and metal and is ignited and operated by an electronic circuit including a half bridge converter with an LC circuit which, when the lamp is not ignited, enters an oscillation state near a resonance frequency which lies near the third harmonic of the switching frequency of the half bridge converter. The vessel encloses a cylindrical discharge space of diameter D and length L, wherein $L \leq D \leq 1.2\,L$.

12 Claims, 2 Drawing Sheets

HIGH-PRESSURE DISCHARGE LAMP WITH MINIATURE DISCHARGE VESSEL AND INTEGRATED CIRCUITRY

BACKGROUND OF THE INVENTION

The invention relates to a high-pressure discharge lamp provided with a discharge vessel with a ceramic wall which encloses a discharge space, a filling comprising at least a rare gas and a metal.

The invention also relates to an electronic circuitry unit suitable for igniting and operating the high-pressure discharge lamp.

A lamp of the kind mentioned in the opening paragraph is known from EP-A-0 215 524. The known lamp is a metal halide lamp whose discharge vessel contains at least one metal halide. The known lamp is very suitable as a light source for inter alia interior lighting for, for example, shop windows, sports halls, etc., also because of its comparatively small dimensions. The light radiated by the lamp has very good photometric properties, such as a color temperature in the range from 3000 K to 4000 K, a color rendering index value Ra of 80 or higher, and a high luminous efficacy.

In the present description and claims, the term "ceramic wall" is understood to refer to a wall made of metal oxide such as, for example, sapphire or densely sintered polycrystalline $Al_2O_3$, or of metal nitride, for example AlN. The discharge vessel contains one or several metal halides and at least one rare gas as its filling ingredients. In addition, the known lamp also contains mercury as a filling ingredient. Although the lamp seems to be highly suitable for miniaturization on account of the small dimensions of the discharge vessel, a separate circuitry unit remains necessary for operating the lamp. This is a disadvantage hampering a wide application range of the lamp.

SUMMARY OF THE INVENTION

According to the invention, the lamp is in addition provided with an electronic circuitry unit.

The integration of the circuitry unit in the lamp permits the lamp to be connected directly to a public power supply mains. This considerably increases its application possibilities. It is a requirement for this, however, that the circuitry unit is an electronic unit, because only under these conditions a sufficient miniaturization of the circuitry unit, and thus of the lamp, can be realized.

It is favorable for an optimum utilization of the possibility of miniaturization to operate the lamp at a high frequency by means of a high-frequency supply from the circuitry unit. Preferably, the lamp is operated at a frequency of at most 40 kHz for preventing as much as possible that lamp instabilities owing to acoustic resonance occur. On the other hand, the lamp is preferably operated at a frequency of at least 19 kHz for preventing noise pollution.

It was found to be possible to manufacture lamps in a reproducible manner which can be operated without acoustic resonances through a very accurate and reproducible dimensioning in the manufacture of the discharge vessel, also in the case of a complicated filling of the discharge vessel such as is the case in a metal halide lamp. It is found that this requirement of a very accurate and reproducible dimensioning in the manufacture of the discharge vessel can only be complied with in conjunction with the desired degree of miniaturization if the discharge vessel has a ceramic wall. It was found to be favorable in this respect when the discharge vessel has a cylindrical portion enclosing the discharge space and having an internal length L, while the discharge vessel has a circular cross-section at the area of the discharge space with an internal diameter D, and the relation $L \leq D \leq 1.2 L$ is complied with. It was found here that the lowest possible longitudinal resonance frequency which can arise in the discharge vessel during lamp operation has a value comparable to radial or azimuth resonances having the lowest possible frequency.

A further miniaturization and a further widening of the application possibilities can be realized in that the lamp preferably has a power rating of no more than 30 W. It is preferable here for the discharge space enclosed by the discharge vessel to have a volume of at most 33 $mm^3$. In an advantageous embodiment of the lamp, the discharge vessel comprises a cylindrical portion which encloses the discharge space and has an internal length L of at most 3.5 mm. It was found that in that case the lowest possible longitudinal resonance frequency is not below 60 kHz. The radial or azimuth resonances are found to have a lowest possible frequency of 67 kHz or more if the discharge vessel has a circular ross-section with an internal diameter D of at most 3.5 mm at the area of the discharge space.

A particularly suitable circuitry unit utilizes a half bridge converter. The half bridge converter comprises two main switching means which are alternately rendered conducting and non-conducting with a switching frequency. This switching frequency of the main switching means at the same time forms the switching frequency of the half bridge converter. This circuitry unit lends itself well to miniaturization, and thus to incorporation in the lamp, owing to its simple construction with only two main switching means.

For lamp ignition, the half bridge converter is provided with a LC circuit which enters a state of oscillation near a resonance frequency when the lamp is not ignited. Preferably, the oscillation takes place at the third harmonic of the switching frequency of the half bridge converter, because the values of currents caused thereby remain comparatively limited then.

In a further advantageous embodiment of the lamp according to the invention, the circuitry unit is provided with a control circuit for controlling the half bridge converter, which control circuit is provided with means for influencing the switching frequency of the half bridge converter. This renders it possible to cause the generation of a high voltage across the LC circuit to take place gradually in time during lamp ingition, which is good for achieving a longer lamp life, in particular the life of the control circuit of the electronic circuitry unit. Preferably, the third harmonic of the switching frequency of the half bridge converter is slightly higher than the resonance frequency of the LC circuit. It is achieved that the voltage occurring across the LC circuit remains limited initially and also that the LC circuit forms an inductive load for the half bridge converter at all the times in that the switching frequency is initially given a temporary higher value by the means for influencing the switching frequency of the half bridge converter.

The electronic circuitry unit comprising a half bridge converter with main switching means is suitable for incorporation in the lamp as well as for incorporation in a separate adapter which is detachable from the lamp.

If current conductors to the discharge vessel are of unequal length, it is preferable for achieving a lamp ignition which is as reliable as possible that the high voltage generated through resonance of the LC circuit should be applied to the current conductor having the smaller length.

The filling of the discharge vessel may comprise Na instead of a metal halide in such a quantity that the lamp forms a high-pressure sodium lamp which radiates white light in the operational state. Such a lamp is known per se from, for example, U.S. Pat. No. 4,475,061 and U.S. Pat. No. 5,097,176.

Preferably, the lamp according to the invention is a reflector lamp. The reflector then at the same time constitutes a suitable thermal screen for the electronic circuitry unit.

In a further advantageous embodiment, the electronic circuitry unit is suitable for igniting and operating a high-pressure discharge lamp according to the invention in which the electronic circuitry unit is provided with main switching means for generating a current of constant polarity through the discharge vessel. The lamp, which is thus DC-operated, has the advantage that the circuitry unit can be of a very simple construction, and accordingly very compact, which renders it highly suitable for incorporation in the lamp. The electronic circuitry unit for direct current operation of the lamp is also suitable for incorporation in a separate adapter which can be detached from the lamp.

BRIEF DESCRIPTION OF THE DRAWINGS

FIGS. 1 and 2 are not shown true to scale.

DETAILED DESCRIPTION OF THE PREFERRED EMBODIMENTS

Figure 1:
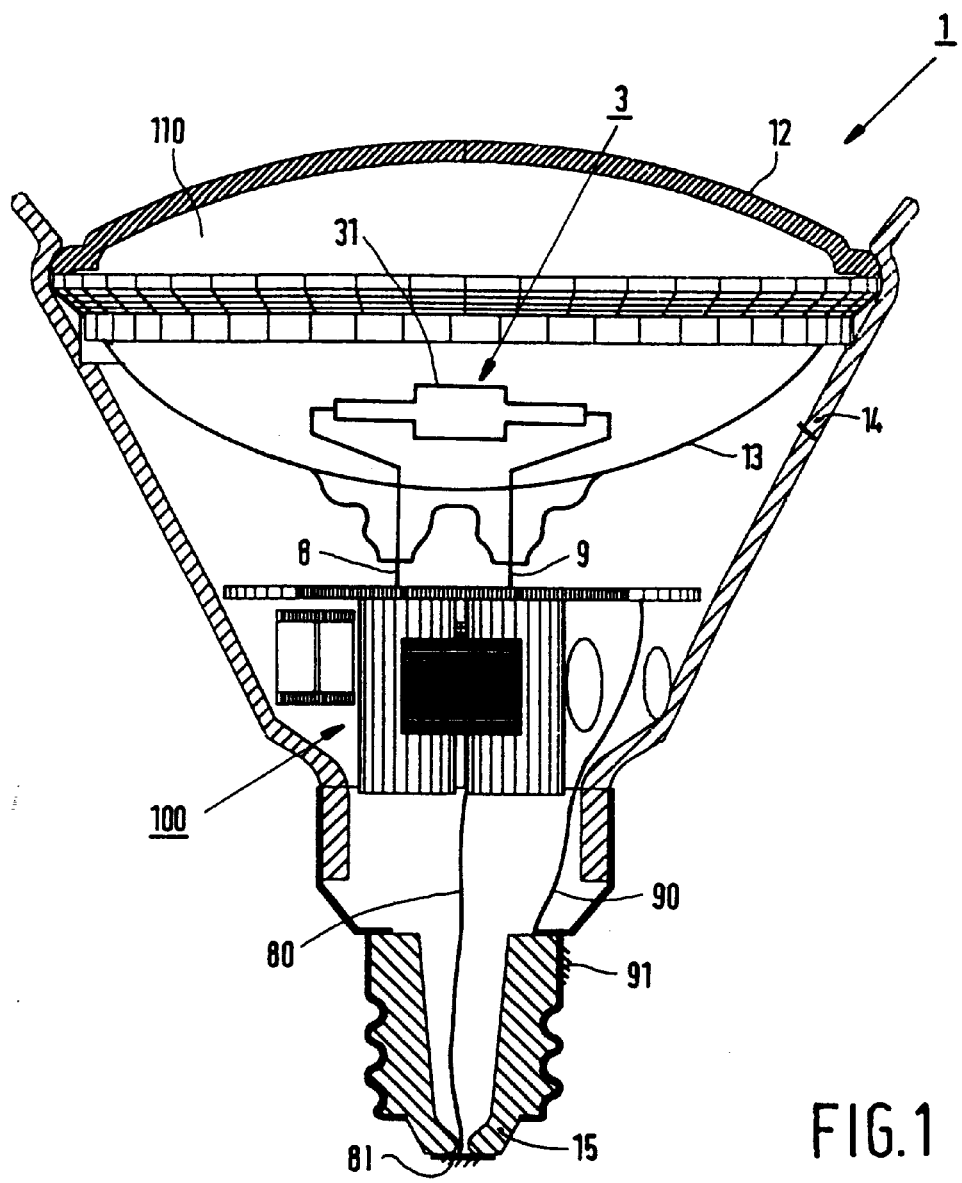
FIG. 1 shows a lamp according to the invention.

In FIG. 1, a high-pressure discharge lamp 1 is provided with a discharge vessel 3 with a ceramic wall 31, a filling comprising at least a rare gas and a metal, and an electronic circuitry unit 100.

The discharge vessel is positioned in a space 110 formed by a reflector 13 closed off by a transparent plate 12. The reflector is fastened to a lamp cap 15 by means of a cup 14. The electronic circuitry unit 100 is accommodated in the space bounded by the cup 14, the reflector 13, and the lamp cap 15. The electronic circuitry unit 100 is connected to connection contacts 81, 91 of the lamp cap 15 by means of electrical conductors 80, 90.

Figure 2:
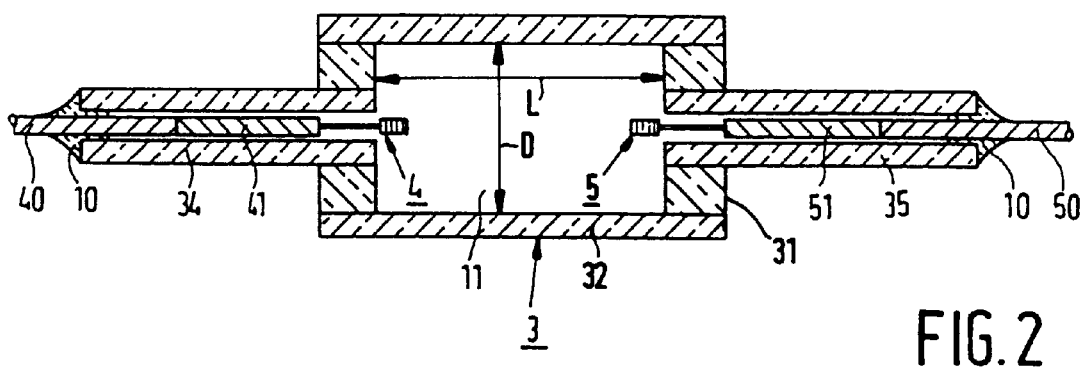
FIG. 2 shows a discharge vessel of the lamp of FIG. 1.

The discharge vessel 3 is shown in more detail in FIG. 2. The discharge vessel has a ceramic wall 31 which has a ceramic plug 34, 35 at both ends for electrical lead-through elements to respective electrodes 4, 5. The lead-through elements each have a halide-resistant portion 41, 51, for example made of Mo, and a portion 40, 50 which is connected to the respective plug 34, 35 in a gastight manner by means of a melting ceramic seal 10. The portions 40, 50 are made from a metal whose coefficient of expansion corresponds very well to that of the projecting plugs. Nb, for example, is a highly suitable material. The portions 40, 50 are connected to respective current conductors 8, 9, which lead to the electronic circuitry unit 100, in a manner not shown in further detail. The discharge vessel comprises a cylindrical portion 32 which encloses a discharge space 11. The cylindrical portion 32 has an internal length L of at most 3.5 mm. The discharge vessel has a circular cross-section with an internal diameter D of at most 3.5 mm at the area of the discharge space.

The discharge space thus enclosed by the discharge vessel has a volume of at most 33 mm$^3$. The relation L$\leq$D$\leq$1.2 L is also complied with within the discharge vessel.

Figure 3:
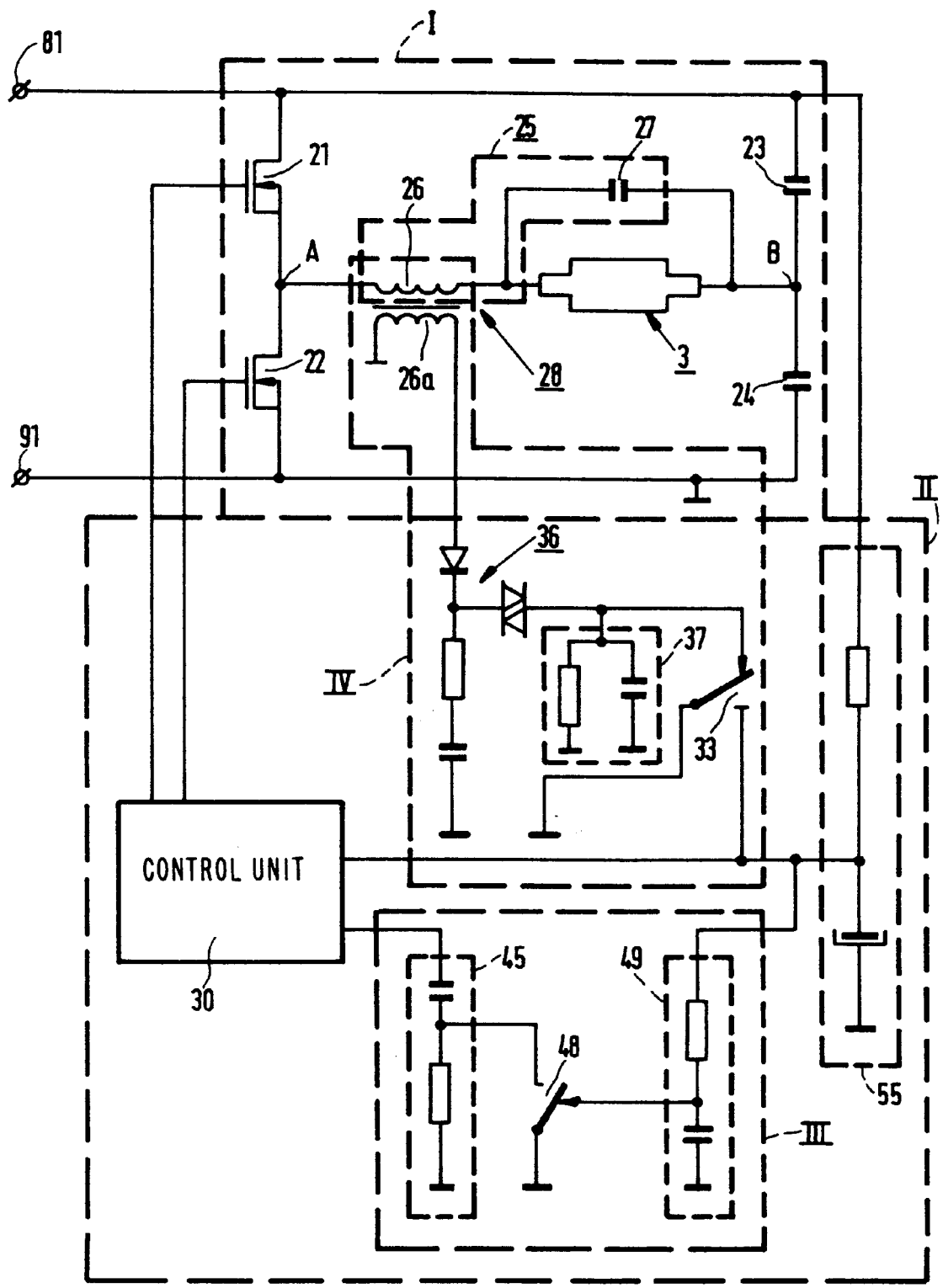
FIG. 3 is a circuit diagram of a circuitry unit of the lamp according to FIG. 1.

The electronic circuitry unit 100 is shown in more detail in FIG. 3, reference numerals 81, 91 denoting the connection contacts of the lamp cap. I is the half bridge converter and II a control circuit for controlling the half bridge converter, which control circuit is provided with means III for influencing the switching frequency of the half bridge converter. The control circuit is also provided with means IV for stopping the switching of the main switching means of the half bridge converter. It is prevented thereby that the voltage across the lamp, in particular across the main switching means and the LC circuit, becomes unacceptably high as a result of resonance of the LC circuit.

The half bridge converter comprises two main switching means 21, 22 which are rendered conducting and non-conducting alternately by means of the switching signals coming from the control circuit. The half bridge converter also comprises bridge capacitors 23, 24. An LC circuit 25 is connected between points A and B and comprises an inductance 26 and a capacitor 27. The discharge vessel 3 is connected electrically in parallel to capacitor 27. The values of the inductance 26 and the capacitor 27 are so chosen that the resonance frequency of the LC circuit corresponds substantially to, but is smaller than the third harmonic of the switching frequency of the two main switching means.

The control circuit comprises a control IC 30 which forms the source of the switching signals by which the main switching means are rendered conducting and non-conducting alternately. Inductance 26 forms part of the means IV for stopping the switching of the main switching means of the half bridge converter. To this end, the inductance 26 forms a primary winding of a transformer 28 with a secondary winding 26a. The voltage detected by means of the secondary winding 26a forms a control signal for rendering a switch 33 conducting, whereby the control IC 30 is disconnected, via a combination 36 of a rectifier network and an RC filter.

To render possible a quick reignition of a lamp which was extinguished, for example owing to a dip in the supply source voltage, the combination 36 is preferably provided with an additional timer circuit 37 with which the switch is rendered non-conducting after a certain period, whereupon the control IC becomes operational again.

The means III which serve to achieve an initial, temporary increase in the switching frequency of the main switching means comprise a timer circuit which is connected to the control IC. In a practical realization, the timer circuit is formed by an RC circuit 45 which can be partly short-circuited by a switch 48. The means III are so designed that a voltage drop across the portion of the RC circuit which can be short-circuited by the switch 48 leads to an increase in the switching frequency as long as said portion is not short-circuited.

Switch 48 is supplied from an auxiliary voltage source 55, which also serves to supply the control IC, via a delay network 49.

In a practical realization of the embodiment of the lamp as described, the lamp has a power rating of 20 W.

The discharge vessel has a cylindrical portion of circular cross-section whose internal length is 3 mm and whose internal diameter is 3 mm. The discharge space thus enclosed comprises besides Hg the metal halides NaJ, TlJ, and DyJ$_3$. The discharge vessel further comprises Ar as an ignition gas.

The space formed by the reflector 13 and closed off by the transparent plate 12 has a filling consisting of a mixture of N$_2$ and Kr. The discharge vessel is narrowly enclosed by a sleeve of quartz glass (not shown in the drawing). The light radiated by the lamp has a general color rendering index value Ra of 87 and a color temperature $T_c$ of 3000 K. The luminous efficacy is 65 Im/W.

The half bridge converter I of the electronic circuitry unit 100 has a switching frequency of 24 kHz during lamp operation. When the lamp is connected to a suitable supply source, the switching frequency is initially raised to 28 kHz. The delay network 49 is so dimensioned here that the temporarily raised switching frequency changes to the switching frequency of 24 kHz after a period of 10 ms. An IR 2151, make International Rectifier, is used as the control IC 30. An alternative type of IC which is also very suitable for use in the lamp according to the invention is the type L6569, make SGS Thomson.

The main switching means 21, 22 are each formed by a type IRF720 MOSFET, make International Rectifier. The bridge capacitors 23, 24 each have a capacitance value of 220 nF. The inductance 26 has a self-inductance value of 3 mH, and capacitor 27 a value of 1.8 nF.

The lamp is suitable for operation on a supply source of 120 V, 60 Hz, and the electronic circuitry unit for this purpose comprises a voltage-raising network (not shown) which is known per se and is arranged between the lamp connection contacts 81, 91 and the half bridge converter 100. The half bridge converter starts switching with the higher frequency of 28 kHz after the lamp has been connected to the suitable supply source. Oscillation of the LC circuit leads to a voltage across the discharge vessel having an amplitude of 500 V during this. After 10 ms, the switching frequency gradually decreases to 24 kHz, so that the LC circuit enters the resonant state and a maximum voltage having an amplitude of 1200 V arises across the discharge vessel. The control IC is switched off by the means IV after 50 ms if the lamp fails to ignite. After a period of 400 ms, the timer circuit 37 then renders switch 33 non-conducting, and the control IC becomes operational again.

We claim:

1. A high-pressure discharge lamp comprising
   a discharge vessel with a ceramic wall which encloses a discharge space, said discharge vessel having a cylindrical portion enclosing said discharge space, said cylindrical portion having an internal length L and an internal diameter D, wherein $L \leq D \leq 1.2\ L$,
   a filling comprising at least a rare gas and a metal, and
   an electronic circuitry unit for igniting and operating the filling in the discharge vessel.

2. A lamp as claimed in claim 1, characterized in that the lamp is operated at a frequency of at most 40 kHz.

3. A lamp as claimed in claim 1, wherein the lamp is operated at a frequency of at least 19 kHz.

4. A lamp as claimed in claim 1, wherein the lamp has a power rating of at most 30 W.

5. A lamp as claimed in claim 1, characterized in that the discharge vessel has a volume of at most 33 mm$^3$.

6. A lamp as claimed in claim 5, characterized in that the internal length of the cylindrical portion enclosing the discharge space is at most 3.5 mm.

7. A lamp as claimed in claim 5 to wherein the discharge vessel has a circular cross-section with an internal diameter D of at most 3.5 mm at the area of the discharge space.

8. A high-pressure discharge lamp as claimed in claim 1, wherein the circuitry unit comprises a half bridge converter provided with main switching means, said half bridge converter having a switching frequency.

9. A lamp as claimed in claim 8 wherein the half bridge converter comprises an LC circuit which, when the lamp is not ignited, enters an oscillation state near a resonance frequency for the purpose of lamp ignition, and in that said resonance frequency lies near the third harmonic of the switching frequency of the half bridge converter.

10. A lamp as claimed in claim 8 further comprising means for influencing the switching frequency of the half bridge converter so that the switching frequency initially has a temporary, higher value.

11. A lamp as claimed in claim 8 wherein the circuitry unit comprises a control circuit for switching the main switching means, which control circuit comprises means for stopping the switching of the main switching means of the half bridge converter.

12. A high-pressure discharge lamp as claimed in claim 1 wherein the electronic circuitry unit comprises main switching means for generating a current of constant polarity through the discharge vessel.

* * * * *